Sept. 27, 1960      J. RODWELL      2,953,855
HEIGHT GAUGES
Filed Oct. 16, 1957      2 Sheets-Sheet 1
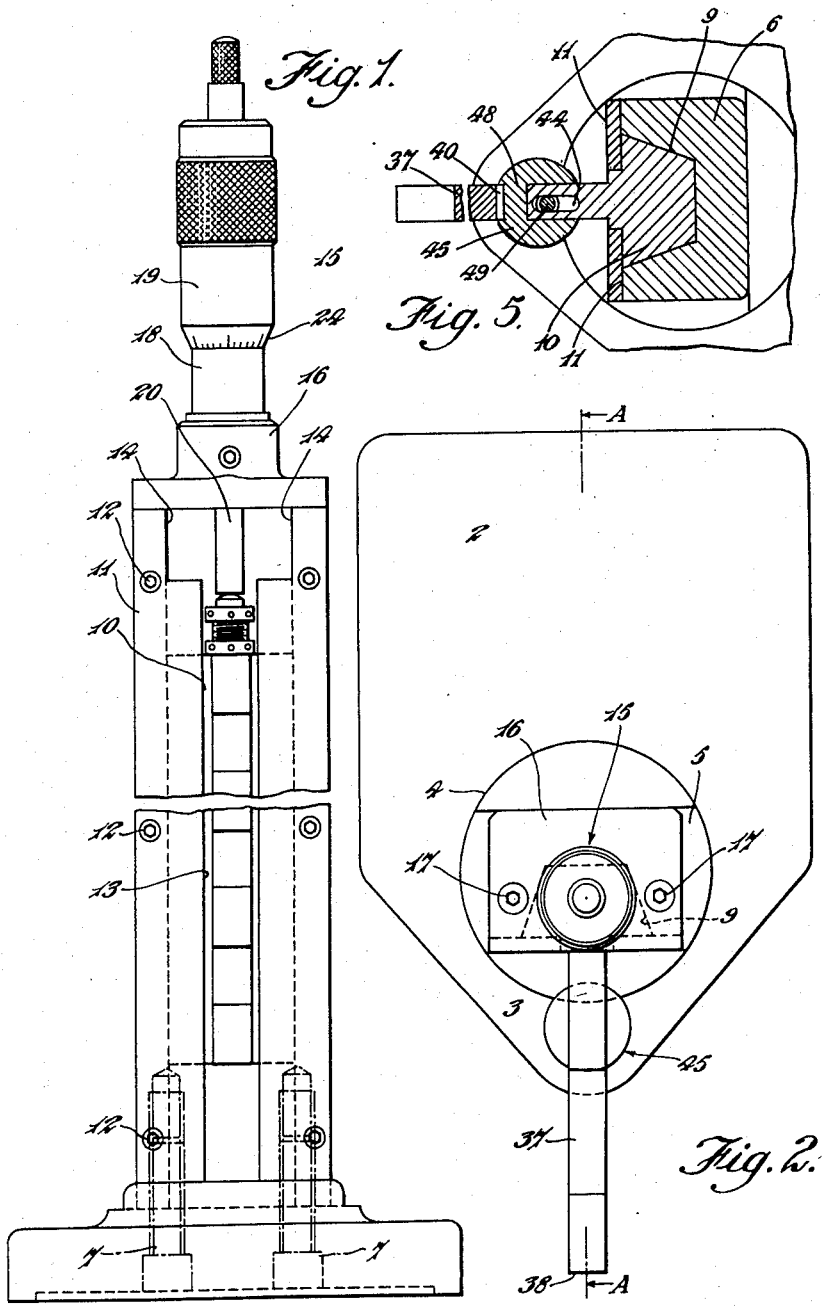
INVENTOR
JOHN RODWELL
By Dean, Fairbank & Hirsch
ATTORNEYS

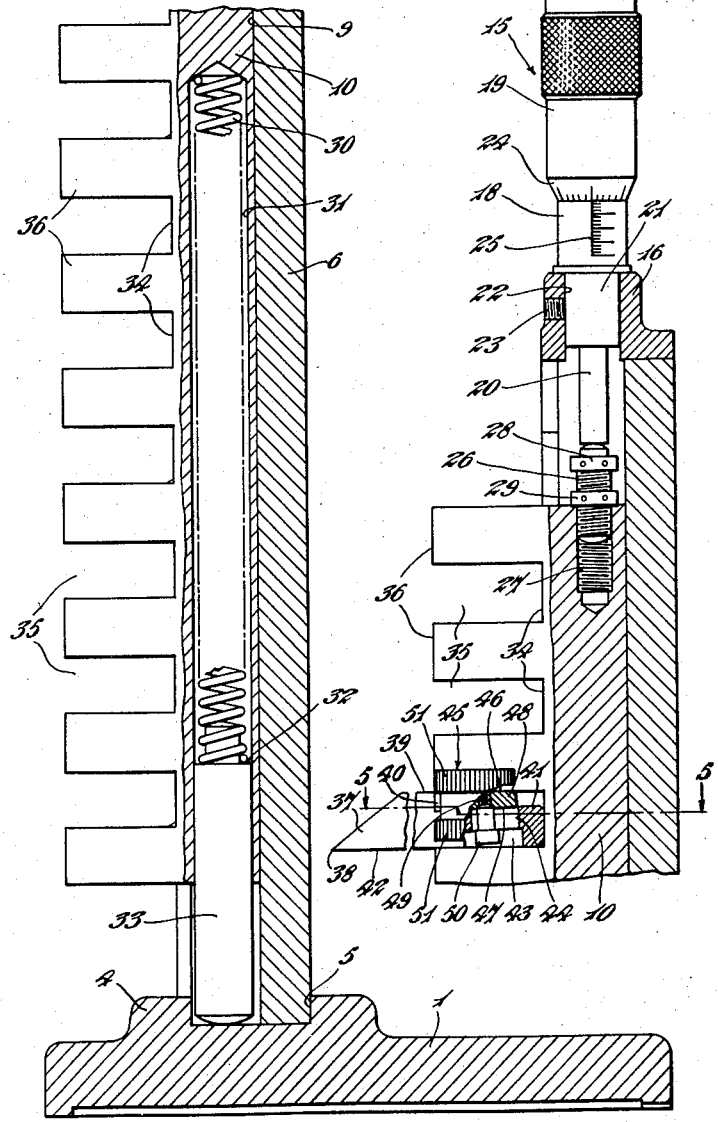

2,953,855
                    HEIGHT GAUGES

John Rodwell, 2 Vicarage Road, Hornchurch, England

Filed Oct. 16, 1957, Ser. No. 690,504

Claims priority, application Great Britain Nov. 19, 1956

4 Claims. (Cl. 33—170)

This invention relates to height gauges and other devices for linear measurement, and has for its object to provide improvements therein.

Height gauges for setting out engineering work comprise a base, a column mounted on the base, a vertically movable slide supported by the column carrying a scriber or index member, and means for measuring the vertical position of the scriber or index member in relation either to a markingout table on which the height gauge is placed, or to a reference surface on the base. Similar instruments with modified bases, may be used for measurement of lengths in directions other than the vertical.

It has been proposed to provide for the mounting of the scriber or index member at any one of a plurality of equally vertically spaced positions on the slide, and to employ a micrometer unit to effect movement of the slide relative to the column, the micrometer unit having a range equal to the distance between adjacent mounting positions for the scriber or index member.

According to the present invention, a height gauge or other device for linear measurement comprises, in combination, a longitudinally grooved column, a slide guided in the groove of the column and having a length which is a large fraction of the length of the column, an abutment at the top of the column, micrometer means for adjusting the position of the slide relative to the abutment, and means on the slide for locating thereon, in any one of a plurality of longitudinally spaced positions, a scriber or index member.

The slide is preferably formed with a series of equally spaced horizontally extending fingers, and a scriber or index member is adapted to be inserted between any two of said fingers, the scriber or index member being secured in position by a wedge member mounted between an inclined surface on the scriber or index member and one of the fingers.

An embodiment of the invention in the form of a height gauge will now be described, by way of example, with reference to the accompanying drawings, in which:

Fig. 1 is a view in front elevation, the central portion being broken away;

Fig. 2 is a plan view;

Fig. 3 is a side elevational view, mainly in section on the line A—A of Fig. 2, of the upper portion of the gauge;

Fig. 4 is a similar view of the lower portion of the gauge; and

Fig. 5 is a sectional view taken along lines 5—5 of Fig. 3.

Referring to the drawings, the gauge includes a flat base 1 comprising in plan a rear rectangular portion 2 integral with a front triangular portion 3. On its upper side the base has a circular boss 4 the centre of which is substantially coincident with the base of the triangular base portion 3. The boss 4 has a transverse, parallel-sided groove.

The groove 5 is adapted to receive a column 6 of rectangular cross-section and of a length somewhat greater than the range of heights to be measured by the gauge. The column is secured perpendicularly to the base by a pair of screws 7. A groove 9 of regular trapezoidal cross-section is formed in the front face of the column, and extends throughout the length thereof. The shorter of the unequal opposite sides of the section forms the base of the groove which is somewhat deeper than half the depth of the column. Whilst the illustrated form of the groove is preferred, the groove may be of rectangular or other cross-section.

A slide 10 has a cross-section such as to fill the groove 9 and a length which is a large fraction, for example nine tenths, of the length of the column 6. The slide is freely movable in the groove and is guided therein by a pair of retaining plates 11 which are secured to the front face of the column 6 by set-screws 12. The outer edges of the plates 11 coincide with the edges of the column 6, the plates extending inwardly to cover a major portion of the groove 9, leaving a central slot 13. The plates 11 extend from the upper face of the boss 4 to the upper end of the column 6, each plate being cut away at 14 to the edge of the groove 9 for a short distance from its upper end.

A micrometer adjusting device, indicated generally at 15, is mounted at the top of the column by means of an abutment member or bracket 16 which is secured to the column by a pair of studs or screws 17. The micrometer is of known type comprising a body 18, a sleeve 19 rotatable thereon, and a rod or spindle 20 secured to the sleeve and having a screw-threaded portion engaging a screw-threaded bore of the body 18 and an unthreaded portion which extends beyond the body. Alternatively, the sleeve 19 may have an internal screw-thread engaging an external screw-thread on the body 18. A reduced extension 21 of the body fits within a bore 22 of the bracket 16, and is secured therein by a set-screw 23. A circumferential scale on the bevelled end 24 of the sleeve 19 co-operates with a longitudinal scale 25 on the body 18.

The micrometer spindle 20 is adapted to engage the rounded end of an adjustable stop 26 which comprises a screw engaging a threaded bore 27 in the slide 10. The screw has a head 28 and a locknut 29. The slide is urged upwardly to maintain the stop 26 in contact with the spindle 20 by means of a coiled compression spring 30, housed in a bore 31 at the lower end of the slide. The spring extends between the base of the bore and a shoulder 32 of a pin 33 which fits slidably within the bore and extends therefrom to engage with its rounded end the bottom of the groove 5 in the base 1.

The slide 10 has throughout its length a rib 34 of rectangular cross-section which extends forwardly with clearance through the central slot 13. The rib is provided with a plurality of equally spaced transverse slots 35. The slots short of the base of the rib by approximately the thickness of the retaining plates 11 and they provide a plurality of parallel-sided, horizontally projecting fingers 36 of equal width and spacing, the distance from the upper face of any one finger to the upper face of the next adjacent finger being equal to the total range of measurement of the micrometer 15, and equal to one or more units of measurement. Preferably the distance is equal to one unit, and if desired the scale may be indicated on the end faces of the fingers.

A scriber or index member 37 is adapted to be quickly and releasably secured in any selected one of the slots 35. The scriber 37 has a width equal to that of a slot 35 and a thickness equal to that of a finger 36. The front end of the scriber is bevelled upwardly and rearwardly so as to provide a lower knife edge 38. The upper face 39 of the scriber has a recess 40 which extends to the rear end of the scriber for a length equal to that of a finger 36. The face 41 of this recess is slightly upwardly and rearwardly inclined, so that, when the lower face 42 of the scriber is in engagement with the upper face of a finger 36, there is provided a rearwardly tapering slot between the scriber and the finger 36 immediately above it. The lower face 42 of the scriber has a centrally disposed longitudinal groove 43, the base of which is inclined so as to be parallel to the inclined face 41. A central longitudinal slot 44 connects the recess 40 to the groove 43.

A wedge member 45, comprising a thick circular disc, is provided on its upper side with a deep diametral groove 46 and on its lower side with a deep diametral groove 47 parallel to the groove 46. The width of each groove is equal to the thickness of a finger 36. The base of the groove 46 is parallel to the top face of the disc. The base of the groove 47 is inclined to the top face of the disc to a degree which corresponds with the inclination of the face 41 to the horizontal. The disc is thus divided by the grooves 46, 47 into two segmental portions joined by a web 48 having a wedge shape similar to the shape of the recess 40. The wedge member may be of square or rectangular shape instead of being a disc.

The wedge member 45 is detachably and slidably mounted on the scriber 37, with its web 48 engaging within the recess 40, and is retained thereon by a screw 49 which has a terminal threaded portion screwed into the web 48, an enlarged unthreaded portion fitting within the slot 44, and a head 50 engaging the base of the groove 43. A finger grip is provided by milled or otherwise roughened portions 51.

In use, the scriber is introduced into a selected slot 35 between two fingers 36, being centered therein by engagement of the upper finger in the groove 46 of the wedge member 45 which is in its retracted position with its web 48 in the deepest portion of the recess 40. The wedge member is then pushed towards the slide 10 so that the wedge-shaped web 48 is jammed between the upper finger and the inclined face 41, thus holding the scriber securely against the lower finger. The scriber is easily released by retracting the wedge member.

The gauge is set initially by adjusting the micrometer to its zero reading and adjusting the stop 26 until the upper face of the lowest finger 36 is an exact number of the selected units of measurement from the bottom of the base 1, two units in the present instance.

Whilst the illustrated embodiment of the invention shows preferred means for releasably securing a scriber or index member in position, other forms of wedging member or other types or releasable fastening device may be employed.

It will be understood that the device according to the invention can be adapted for linear measurement in directions other than the vertical. For example the column may be mounted on a modified base by means of which it can be secured, in a horizontal position, to the machine table of a machine tool, and the device used in conjunction with a dial indicator fixed to the body of the machine. The device then enables the table to set to a selected position relative to the machine body without relying on the lead screw for determining the position, so that the measurement is unaffected by inaccuracy of or wear in the lead screw.

I claim:

1. A height gauge or other device for linear measurement comprising, in combination, a longitudinally grooved column, a slide guided in the groove of the column and having a length which is a large fraction of the length of the column, an abutment at the top of the column, micrometer means for adjusting the position of the slide relative to the abutment, a plurality of equally spaced fingers extending horizontally from the slide, a scriber or index member, and wedge means releasably to secure said scriber or index member between any adjacent pair of said fingers.

2. The combination set forth in claim 1 in which said scriber or index member is of substantially the same cross section as the space between two adjacent fingers, a portion of the upper face of such scriber or index member being adapted to be received within said space, said portion having a wedge shaped recess, and said wedge means comprises a wedge member slidably movable into said recess.

3. The combination set forth in claim 2 in which said wedge member comprises a horizontally disposed disc having an upper diametrical groove and a lower diametrical groove parallel thereto, said grooves dividing said disc into two segmental portions, a web connecting said portions, said web having a wedge shape complementary to that of said recess in which it is adapted to move, the upper groove being adapted to receive the upper of said two adjacent fingers and the lower groove being adapted to receive the recessed end of said scriber or index member.

4. The combination set forth in claim 3 in which said scriber or index member has a slot and comprises a screw secured to said wedge member and slidable in said slot, which releasably connects said wedge member to said scriber or index member.

References Cited in the file of this patent

UNITED STATES PATENTS

| | | |
|---|---|---|
| 2,515,583 | Bennett | July 18, 1950 |
| 2,713,208 | Bizzoco | July 19, 1955 |
| 2,752,688 | Sagona | July 3, 1956 |
| 2,766,531 | Egli | Oct. 16, 1956 |